US011126796B2

(12) United States Patent
Chhabra et al.

(10) Patent No.: US 11,126,796 B2
(45) Date of Patent: Sep. 21, 2021

(54) INTELLIGENT SUMMARIES BASED ON AUTOMATED LEARNING AND CONTEXTUAL ANALYSIS OF A USER INPUT

(71) Applicant: MICROSOFT TECHNOLOGY LICENSING, LLC, Redmond, WA (US)

(72) Inventors: Shalendra Chhabra, Seattle, WA (US); Eric Randall Sexauer, Woodinville, WA (US); Jason Thomas Faulkner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 16/354,898

(22) Filed: Mar. 15, 2019

(65) Prior Publication Data
US 2020/0293618 A1 Sep. 17, 2020

(51) Int. Cl.
*G06F 40/30* (2020.01)

(52) U.S. Cl.
CPC .................... *G06F 40/30* (2020.01)

(58) Field of Classification Search
CPC .... G06F 40/00–58; G06F 17/02; G06Q 10/10
USPC .............................. 704/1, 9, 10, 27, 270–275
See application file for complete search history.

(56) References Cited

U.S. PATENT DOCUMENTS

| 7,856,469 | B2 | 12/2010 | Chen et al. |
| 8,914,452 | B2 | 12/2014 | Boston et al. |
| 9,116,984 | B2 | 8/2015 | Caldwell et al. |
| 9,560,152 | B1 | 1/2017 | Jamdar et al. |
| 10,178,708 | B1 | 1/2019 | Gan et al. |
| 2003/0122874 | A1 | 7/2003 | Dieberger et al. |
| 2008/0281922 | A1* | 11/2008 | Renshaw ............ G06F 16/345 709/206 |
| 2008/0281927 | A1* | 11/2008 | Vanderwende ...... G06Q 10/107 709/206 |
| 2009/0157709 | A1 | 6/2009 | Kruger et al. |

(Continued)

OTHER PUBLICATIONS

"International Search Report and Written Opinion Issued in PCT Application No. PCT/US20/021292", dated Jun. 26, 2020, 12 Pages.

(Continued)

*Primary Examiner* — Jesse S Pullias
(74) *Attorney, Agent, or Firm* — Newport IP, LLC; Scott Y. Shigeta

(57) ABSTRACT

The techniques provided herein improve existing systems by automatically generating summaries of a document in response to a user input that defines selected segments of a document. The document can include any type of content such as, but not limited to, channel conversations, chat threads, transcripts, word processing documents, spreadsheets, etc. As the user indicates a selection of segments, a system can dynamically update a summary of the segments to inform a user of salient information that is shared in the selected segments. A summary can include a text description of the information having a threshold priority level. A system can analyze documents that are referenced within the selected segments and provide summaries of the documents. The techniques disclosed herein also provide a number of graphical elements that communicate additional context of each part of the summary.

21 Claims, 14 Drawing Sheets

(56) References Cited

U.S. PATENT DOCUMENTS

| | | | |
|---|---|---|---|
| 2010/0070402 A1 | 3/2010 | Friesen et al. | |
| 2011/0208816 A1* | 8/2011 | Chavez | G06Q 10/107 |
| | | | 709/206 |
| 2011/0289106 A1* | 11/2011 | Rankin, Jr. | G06F 16/284 |
| | | | 707/769 |
| 2014/0046976 A1* | 2/2014 | Zhang | G06Q 50/01 |
| | | | 707/772 |
| 2014/0304614 A1* | 10/2014 | McAlear | G06F 3/04842 |
| | | | 715/752 |
| 2017/0124034 A1* | 5/2017 | Upadhyay | G06F 40/166 |
| 2017/0161372 A1* | 6/2017 | Fern Ndez | G06F 40/268 |
| 2018/0287981 A1 | 10/2018 | Leiba et al. | |
| 2018/0337963 A1 | 11/2018 | Faulkner et al. | |

OTHER PUBLICATIONS

"The Collaboration Hub that Moves Work Forward", Retrieved from: https://web.archive.org/web/20190112184210/https:/slack.com/features, Retrieved Date: Jan. 30, 2019, 4 Pages.

Zhang, et al., "Making Sense of Group Chat through Collaborative Tagging and Summarization", In Proceedings of the ACM on Human-Computer Interaction, vol. 2, Nov. 2018, 27 Pages.

* cited by examiner

INTELLIGENT SUMMARIES BASED ON AUTOMATED LEARNING AND CONTEXTUAL ANALYSIS OF A USER INPUT

BACKGROUND

There are a number of different systems and applications that allow users to collaborate. For example, some systems provide collaborative environments that allow participants to exchange live video, live audio, and other forms of data within a communication session. In other examples, some systems allow users to post messages to a channel having access permissions for a select group of individuals for the purposes of enabling team-focused or subject-focused conversations.

Although there are a number of different types of systems and applications that allow users to collaborate, users may not always benefit from a particular exchange of information or a meeting using these systems. For example, if a person takes time off from work, that user may have missed a number of events. And it may take some time for that user to catch up with respect to the details of each event. In one specific example, when it comes to tracking messages within a channel having a large number of entries, the user may have a difficult time following the conversation. Even worse, if a person is out of the office for an extended period of time, e.g., a vacation, there may be hundreds or even thousands of messages within a particular channel. Given the vast amount of information that can be shared, any person can have a difficult time catching up to the events of a channel, or even worse, the events of a number of channels.

Such drawbacks of existing systems can lead to loss of productivity as well as inefficient use of computing resources. When a person is required to review large sets of data, the use of a number of computing resources, such as networking resources and processing resources, may not be optimized.

SUMMARY

The techniques disclosed herein improve existing systems by automatically generating summaries of a document in response to a user input that defines selected segments of the document. The document can include any type of content such as, but not limited to, channel conversations, chat threads, transcripts, word processing documents, spreadsheets, presentation files, etc. As the user indicates a selection of segments, a system can dynamically update a summary of the segments to inform the user of salient information that is shared within a particular period of time. A summary can include a text description of the salient information. The text description can include computer-generated sentences or sentences that are extracted from the selected segments. In addition, a system can analyze documents that are referenced within the selected segments and provide summaries with respect to the contents of the documents. The summary can be dynamically adjusted based on a user input. Thus, as the user adjusts the selection of the segments, the summary can be updated in response to each adjustment to the input. For illustrative purposes, a summary that is generated in response to a user input that defines a selection of segments of a document is referred to herein as a "Just-in-Time summary."

In some embodiments, a summary may include computer-generated sections and other sections that are direct quotes of the selected segments. The summary may graphically distinguish the computer-generated sections from the other sections that are direct quotes of the selected content. For instance, if a summary includes two computer-generated sentences describing selected segments of a channel and three sentences that directly quote posts of the selected segments, the two computer-generated sections of the summary may be in a first color and the other sentences may be in a second color. By distinguishing quoted sections from computer-generated sections, the system can readily communicate the reliability of the content.

In some embodiments, different sections of a summary may include links to the resource for the particular content. For instance, if a particular section of a summary, e.g., a particular sentence of a summary, is generated to summarize channel posts of a particular user, that user's identity may be displayed in association with that particular section of the summary. In some configurations, the display of the user identity may be in response to a particular user input, such as a hover or another input that indicates a selection of the section of the summary.

A number of different inputs can be utilized to select a number of segments of a document. For instance, an input can include a voice command or other gestures indicating a selection of segments. In one illustrative example, a user can provide an input stating "I would like a year-to-date summary of a chat thread from the Shipping Team Channel." In another example, a user can state "please show me a summary of the Shipping Team Channel while I was out of the office." In such an embodiment, the system may then access scheduling information from an external resource such as a calendar database. The scheduling information can then provide the parameters for defining the selected segments.

Among a number of other benefits, the system can also identify permissions for certain sections of the summary and take actions on those summaries based on the permissions. For instance, if a person attached a file to a thread of a channel, and the file had secured sections, a summary may redact the secured sections from the summary.

The efficiencies derived from the techniques described above can lead to more efficient use of computing systems. In particular, by automating a number of different processes for generating and identifying a summary, user interaction with the computing device can be improved. The reduction of manual data entry and improvement of user interaction between a human and a computer can result in a number of other benefits. For instance, by reducing the need for manual entry, inadvertent inputs and human error can be reduced. This can ultimately lead to more efficient use of computing resources such as memory usage, network usage, processing resources, etc. The techniques disclosed herein can lead to a more efficient use of computing resources by eliminating the need for a person to retrieve, display and review vast amounts of data.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
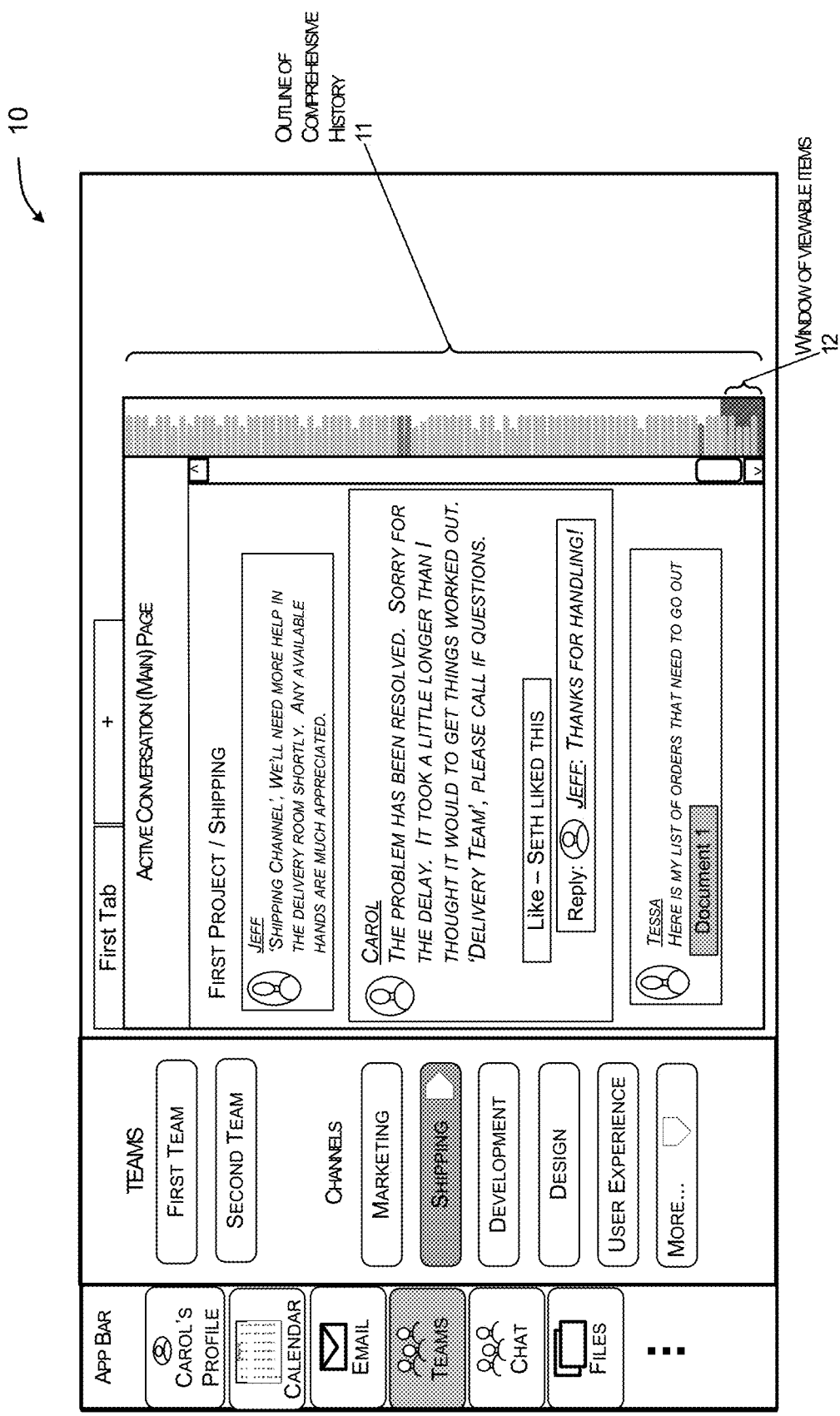
FIG. 1 illustrates an example user interface that can be generated from an application configured to display a document having a number of segments.

FIG. 1 illustrates an example user interface 10 that can be generated from an application configured to display a document. In this example, the document is in the form of a channel comprising a number of channel entries provided by a number of users. For illustrative purposes, each entry of the document is referred to herein as a segment. The document can also be referred to herein as a "thread" or an "originating document." Although this example illustrates a document in the form of a channel conversation, it can be appreciated that any type of data structure having multiple segments can be utilized with aspects of the present disclosure. For instance, the document may be in the form of a word processing document and each segment can be formed by any type of formatting character such as a paragraph break, section break, page break, etc. Similarly, for spreadsheets and other documents, a segment may include any type of section of data such as a cell or group of cells. Other data formats can include a comma delimited text document, an image having segments delimited by graphical features, etc.

In the example shown in FIG. 1, the application generating the user interface 10 can display a historical graphical element 11 representing a history of a thread having a number of segments. The user interface 10 can also include another graphical element 12 for indicating the segments that are displayed in a window of viewable items. As shown, the entries shown in the center of the user interface 10 are represented in the highlighted section of the historical graphical element 11.

In some configurations, a system executing the application for generating the user interface 10 can receive an input indicating a selection of a subset of the segments. As described below, the input can define a timeline for generating a summary of a subset of the segments that are within the timeline.

Figure 2:
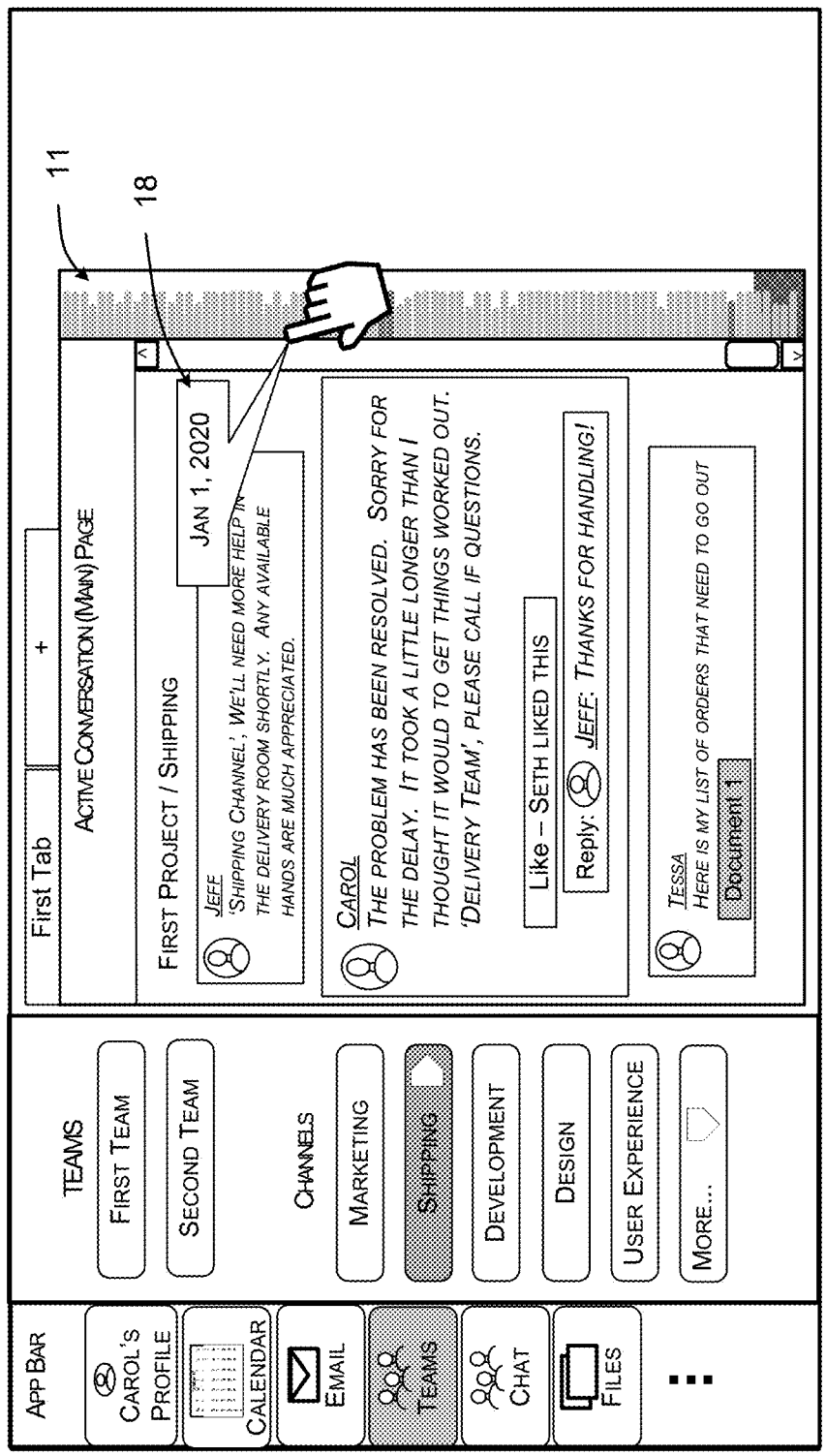
FIG. 2 illustrates a first step of the selection process for a subset of segments.

FIG. 2 illustrates a first step of the selection process. When the user hovers a pointing device or interacts with a touchscreen at a particular position within the historical graphical element 11, the system may generate a start-time graphical element 18, which can show a time and/or date associated with that selected position. As shown, this graphical element can guide the user into finding a desired start time for a timeline.

Figure 3:
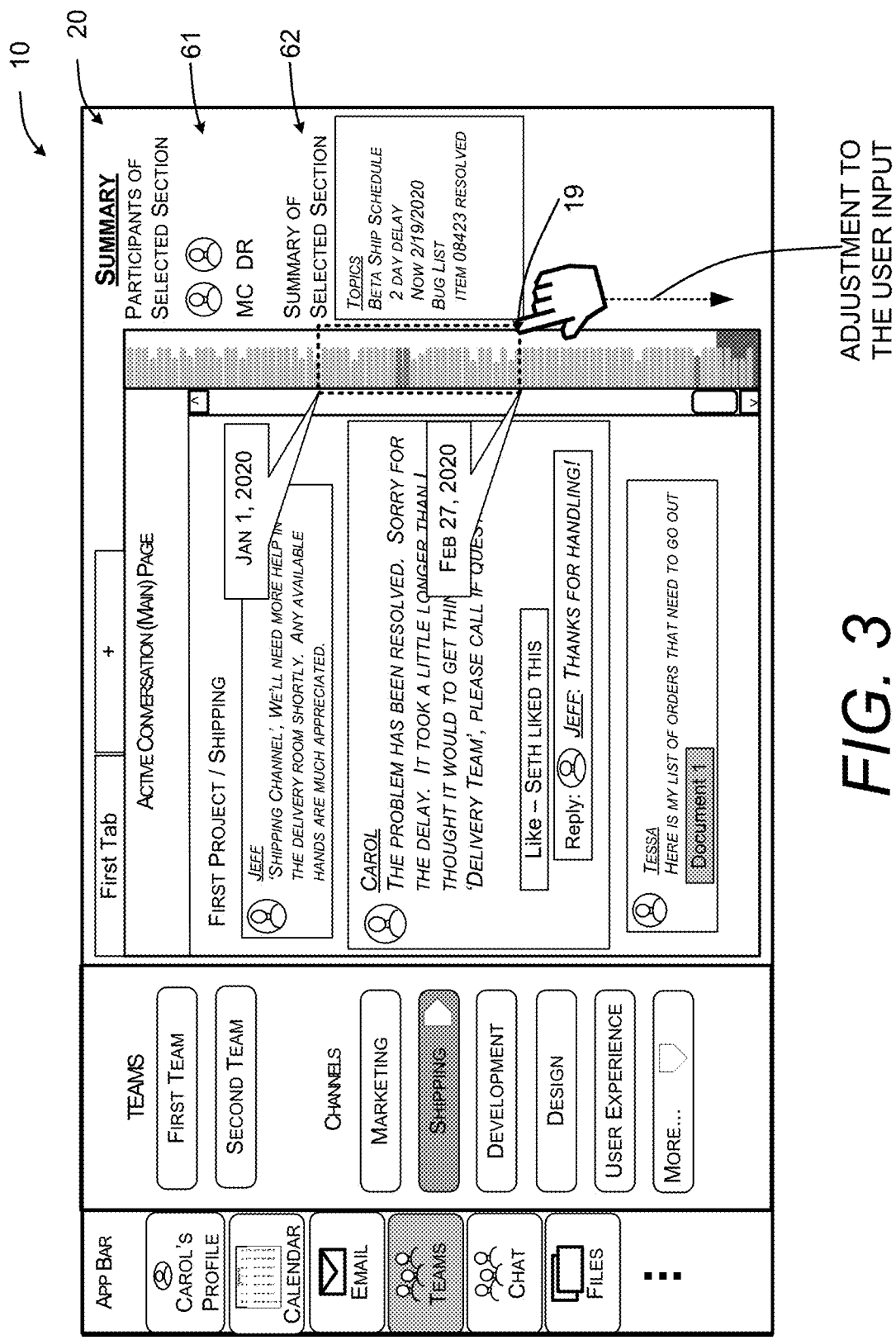
FIG. 3 illustrates a second step of the selection process for a subset of segments.

FIG. 3 illustrates a second step of the selection process. After selecting the start time, the user can move the pointing device or interact with a touchscreen to select a second location within the historical graphical element. In this example, the user has moved the pointer down to a second location thus selecting a subset of segments, e.g., a selection of channel entries. As the user positions the pointer, the system can generate an end-time graphical element 19, which can show a time and/or date associated with that selected position. In this example, the user input indicates a selection of segments from Jan. 1, 2020 to Feb. 27, 2020.

Once a start-time and an end-time of a timeline has been established, the system analyzes the subset of segments, e.g., the selected segments, to generate a number of sentences describing content of at least a portion of the subset of the segments. In addition, or in the alternative, the system can select quotes from the content of the selected segments.

The system can generate a number of sentences that summarize the content of the selected segments. In some configurations, the sentences can be generated from a subset of the segments meeting a threshold requirement or a priority threshold. In one illustrative example of a threshold requirement, a number of sentences summarizing a number of selected segments may be generated based on a priority of a particular topic. For instance, if there are several different entries, e.g., segments, that each state, "there is a problem with shipping," "shipping is going to be delayed," "we might have delays based on packaging," and "shipping will not be on time, it will be late," the number of occurrences of a particular word can be used to determine a priority for a keyword, and the priority can be compared against a threshold, e.g., a priority threshold. If the number of occurrences of a particular keyword exceeds the threshold, the system can determine that particular keyword as a topic. The system can then generate a number of sentences around that topic. In the current example, it is a given that the word "shipping" occurs a threshold number of times. In response to this determination, the word "shipping" is given a priority that causes the system to generate a number of sentences around this selected word. Other words, also referred to herein as supporting words, that surround the selected word can be used to generate sentences, such as "delay," "late," etc. Stock phrases can be used, such as "_____ is going to be _____." The system can populate the fields with the selected word and the supporting words to result in a sentence, e.g., "shipping is going to be late." This example is provided for illustrative purposes and is not to be construed as limiting. It can be appreciated that the system can generate a number of sentences from different segments based on any type of threshold requirement, and a threshold requirement is not limited to embodiments involving a priority. For instance, a threshold requirement can define any criteria that can be used to identify a relationship between any subset of segments or portions of a subset of segments. For instance, a subset of segments may meet a threshold requirement based on a number of phrases or keywords that align with a template or other keywords defined in one or more preferences. Any suitable machine learning techniques for identifying similarities between keywords and phrases may also be utilized to select a subset of segments of a document.

It can be appreciated that a priority can be based on a number of other factors. For instance, in addition to or alternatively, a priority can be based on interpreted language from one or more segments. For instance, the words "important" or "urgent" can raise the priority of a particular set of content within a thread. Other predetermined adjectives or adverbs may be utilized in conjunction with a word count of a particular keyword to raise or lower a priority. These examples are provided for illustrative purposes and are not to be construed as limiting. It can be appreciated that any suitable interpretation or analysis of a thread or a document can be used to associate a priority with a particular segment of the thread or document.

In some configurations, the system may only count certain categories of keywords, such as nouns or verbs. Some words can be ignored such as "the," "and," "she," "he," etc. In addition, the system may also select a number of sentences from the selected segments and directly quote those sentences. General algorithms for checking the grammar of each sentence may be utilized. If a sentence within a selected segment meets one or more criteria, e.g., that it is a complete sentence, it has proper grammar, and it contains a topic, the system may quote the sentence within a summary.

FIG. 3 further illustrates an example of a summary 20 that is generated by the system. In this example, the summary is based on the content of the selected segments. In addition to generating sentences describing the content of the selected segments, the system can also identify usernames and display the usernames in one or more graphical elements 61. The summary 20 also includes a section 62 containing the generated and quoted sentences.

In some configurations, the summary can be updated dynamically. Thus, as the user adjusts the selection of the segments, the summary can be updated in response to each adjustment to the input.

Figure 4:
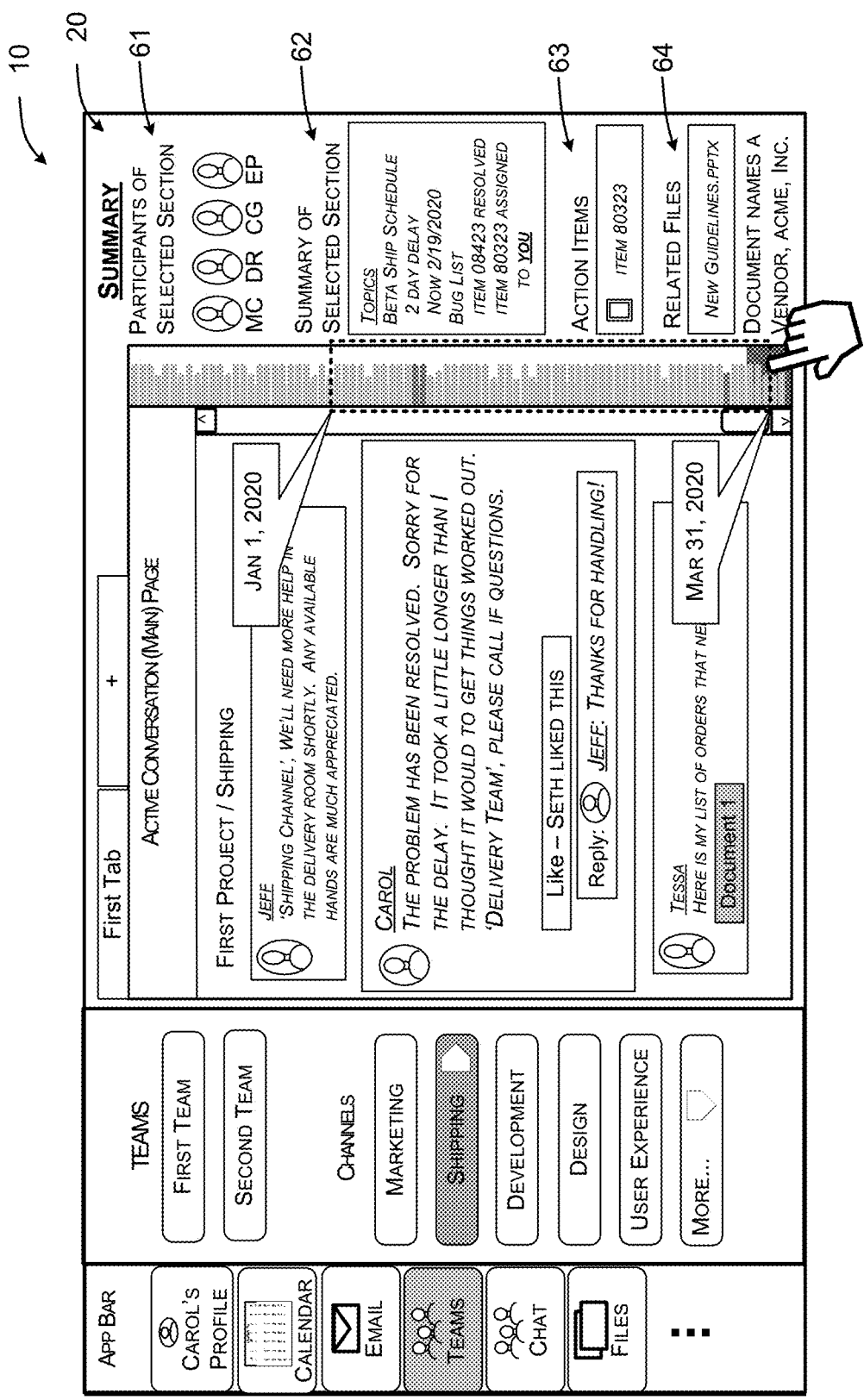
FIG. 4 illustrates an example summary that is dynamically updated based on an adjustment to a user input.

FIG. 4 illustrates an example of this feature. As shown, the user has extended the selected area of the history, and the user input now indicates a start date of Jan. 1, 2020 and an end date of Mar. 30, 2020. Based on this indication, the summary is dynamically updated to include new sections and new content based on this adjustment to the input.

In the example shown in FIG. 4, the summary 20 includes action items 63 and related files 64. Action items can be generated by the detection of a request within the selected segments. For example, if a channel entry directs a task to a particular user, that task is recorded and entered in the summary as an action item. An action item can also be displayed with a radial checkbox that may be actuated by the recipient of the action item upon completion of the task. In addition, the system can identify files that are attached or linked with the selected segments. Such files can be identified and provided within a summary.

Also shown in FIG. 4, additional content derived from the file can also be summarized. In this example, the system analyzes the guidelines.pptx file and determines that the document includes content that names a vendor, Acme, Inc. Such content can be included in a summary and can be generated using the techniques disclosed herein or any other techniques for summarizing a document. In one illustrative example, a document can be analyzed for content having a threshold level of relevancy to the selected segments. For instance, if the selected sections indicate a particular topic having a threshold priority, any document content having keywords that are related to the topic can be extracted from the document and provided in the summary.

Any suitable technique for identifying a threshold of relevancy can be utilized. One or more machine learning algorithms can be utilized to identify and score similarities and differences between a file and one or more selected segments of a thread or document. A threshold level of relevancy can be based on a number of keywords or phrases that are shared between a file and one or more selected segments of a thread or document. Alternatively, or in addition, one or more machine learning mechanisms may be utilized. For example, a classification mechanism may be utilized to determine whether a file has a threshold level of relevancy with one or more selected segments of a thread or document. The classification mechanism may classify the sections of a file and segments of a document into different categories that provide an indication of whether there are similarities or differences. For example, the sections of a file may be classified into a first category (e.g., not likely to be relevant) and a second category (e.g., likely to be relevant). In some configurations, more classification categories may be utilized. In other examples, a statistical mechanism may be utilized to determine whether a file has a threshold level of relevancy with one or more selected segments of a thread or document. For example, a linear regression mechanism may be used to generate a score that indicates a likelihood that a file has a threshold level of relevancy with one or more selected segments of a thread or document. Linear regression may refer to a process for modeling the relationship between one variable with one or more other variables. Different linear regression models might be used to calculate the score. For example, a least squares approach might be utilized, a maximum-likelihood estimation might be utilized, or another approach might be utilized. Such machine learning algorithms may also be utilized for other aspects of the present disclosure.

In some configurations, a system can receive an adjustment to the input, and the adjustment can increase or decrease the number of segments of the subset of segments. The system can then add content to the summary in response to an adjustment to the input that increases the number of segments of the subset of segments. Alternatively, the system can remove content of the summary in response to an adjustment to the input that decreases the number of segments of the subset of segments.

In some embodiments, a summary may include computer-generated sections and other sections that are direct quotes of the selected content. A user interface can graphically distinguish the computer-generated sections from the other sections that are direct quotes of the selected segments. For instance, if a summary includes two computer-generated sentences describing selected segments of a channel and three sentences that directly quote posts of the selected segments, the two computer-generated sections of the summary may be in a first color and the other sentences may be in a second color. By distinguishing quoted sections from computer-generated sections, the system can readily communicate the reliability of the content.

Figure 5:
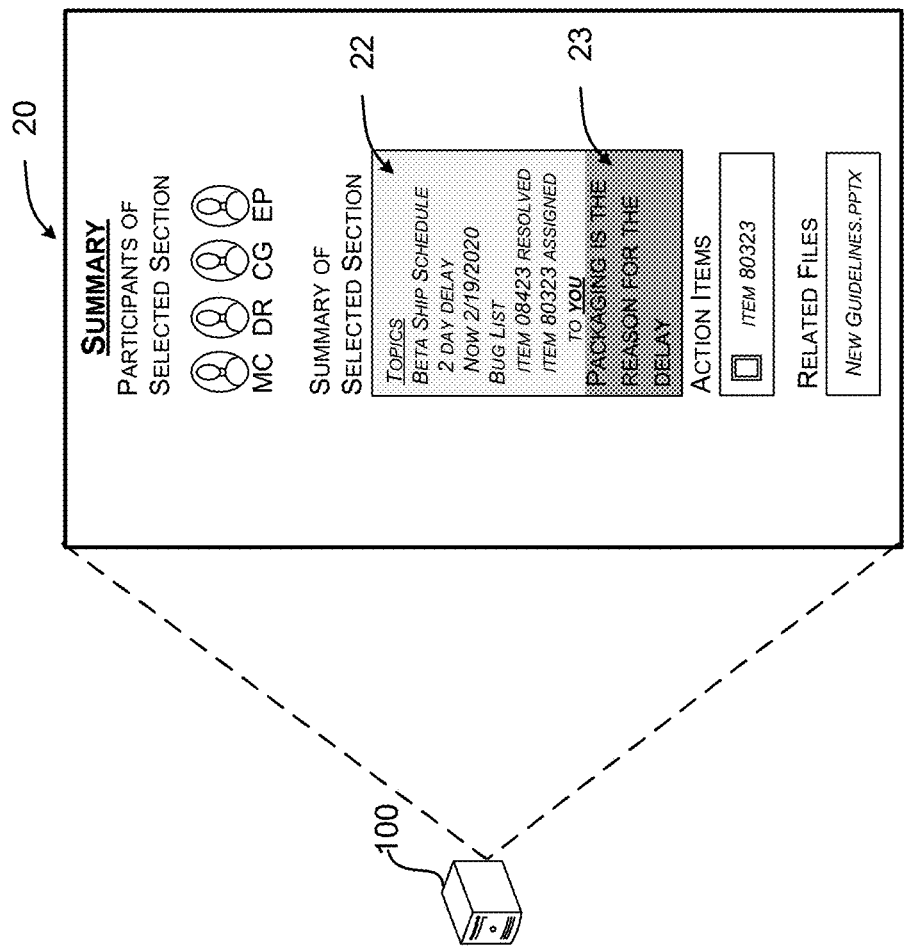
FIG. 5 illustrates one example of a user interface that distinguishes computer-generated sentences from content extracted from a document.

FIG. 5 illustrates one example of a user interface 20 that comprises a first graphical element 22 that indicates the computer-generated sections of the summary. This example also includes a second graphical element 23 that indicates the sections of the summary that are direct quotes of the selected segments. This example is provided for illustrative purposes and is not to be construed as limiting. It can be appreciated that other graphical elements can be used to distinguish the computer-generated sections and the quoted sections. Different colors, shapes and/or text descriptions can be utilized to distinguish the sections.

Figure 6:
FIG. 6 illustrates an example of a user interface that provides graphical elements revealing a source of information.
Figure 6:
Figure 6:

In some configurations, a user interface 20 of a summary can also include a number of graphical elements indicating a source of information included in the summary. These graphical elements can identify a user that provided the information or a system that provided information. FIG. 6 illustrates an example of a user interface 20 that provides graphical elements revealing a source of information. In this example, the user interface 20 transitions from a first state (left UI) to a second state (middle UI) when a user selects a section of the summary. In this example, the selected section describes a "beta ship schedule." In response to the selection, the system causes the user interface 20 to display a graphical element 24A indicating a user identity that contributed to the content of the selected section.

The user interface 20 transitions from the second state (middle UI) to a third state (right UI) when a user selects another section of the summary. In this example, the newly selected section, describing "item 08423," is highlighted. In addition, the system causes the user interface 20 to display another graphical element 24B indicating another user identity that contributed to the content of the newly selected section.

Figure 7A:
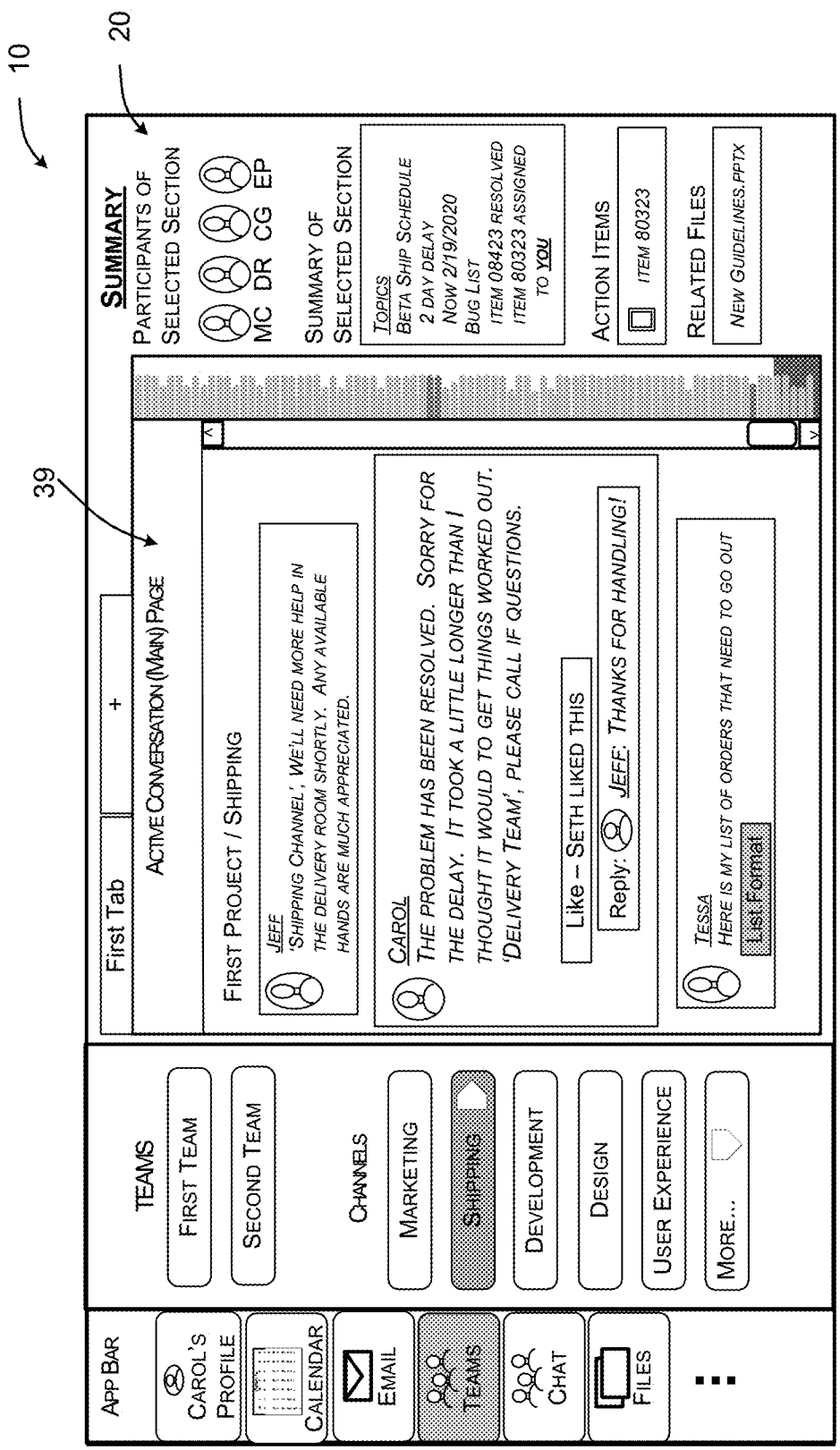
FIG. 7A illustrates a first step of a transition of a user interface when the user selects a section of a summary.
Figure 7B:
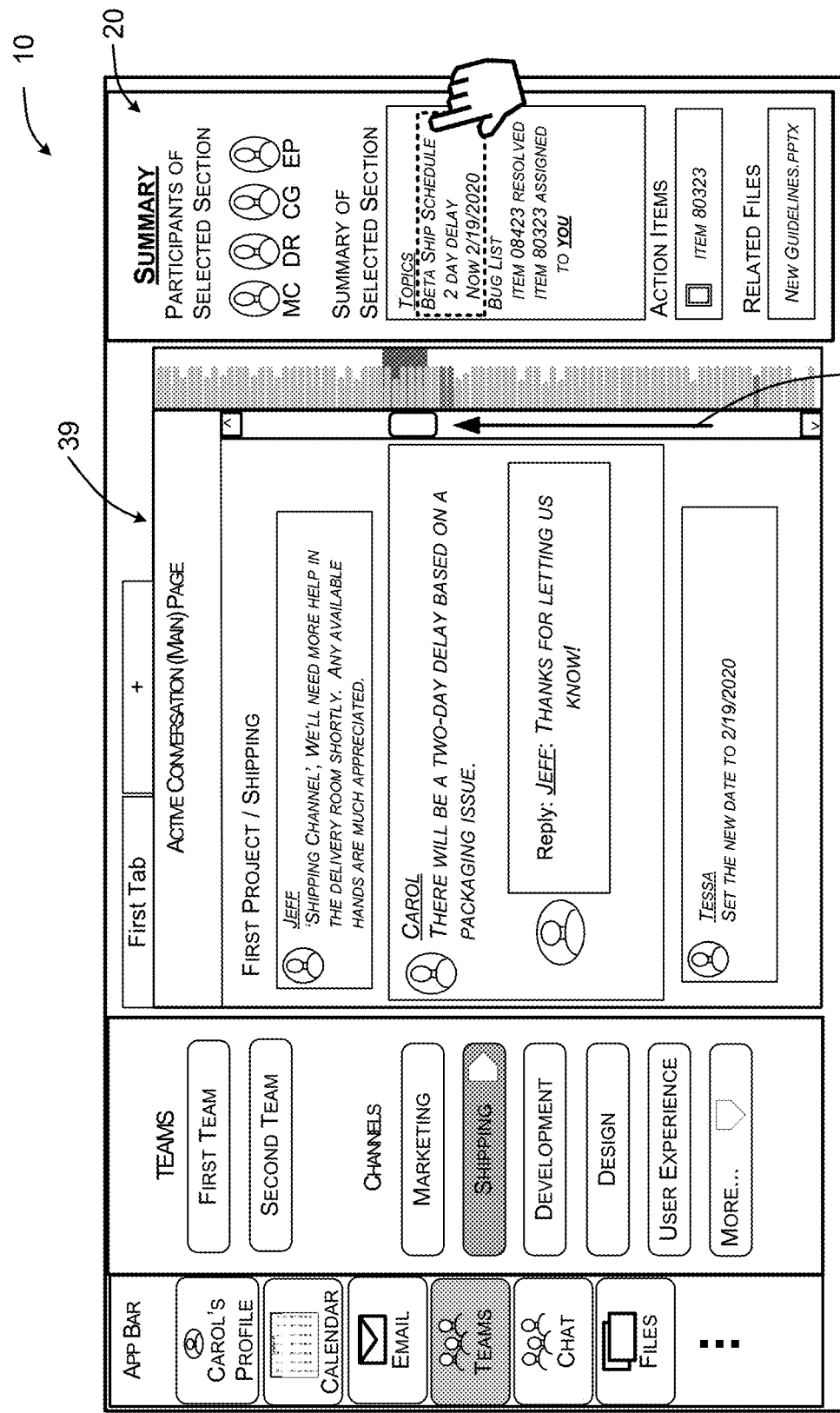
FIG. 7B illustrates a second step of a transition of a user interface when the user selects a section of a summary.

FIG. 7A and FIG. 7B illustrate an example of a transition of a user interface 10 when the user selects a section of a summary. Specifically, FIG. 7A illustrates a first step of a transition of a user interface when the user selects a section of a summary. FIG. 7B illustrates a second step of a transition of a user interface when the user selects a section of a summary. In this example, the system can cause the user interface 10 to navigate to a particular section of the document pertaining to the selected section of the summary in response to a user selection of a particular section of a summary 20. The user interface 10 shown in FIG. 7A is configured to receive a user input within certain sections of the summary. For instance, a user can select a particular topic, action item, or file. In some embodiments, the selection can be made by a second level of interaction, such as a hover and "tap" (actuation of a mouse button) of a pointing device or a double tap of a touch screen, or a voice command. Based on a second level of interaction, the user input indicates a selection of a section "Beta Ship Schedule" and in response to that selection, as shown in FIG. 7B, the main display area 39 of the user interface 10 can automatically navigate, e.g., scroll, to the segments of the document that relate to the selected section of the summary. This feature enables users to readily see the actual source of the content in the context of the discussion around the segments of the originating source of the content.

Figure 8A:
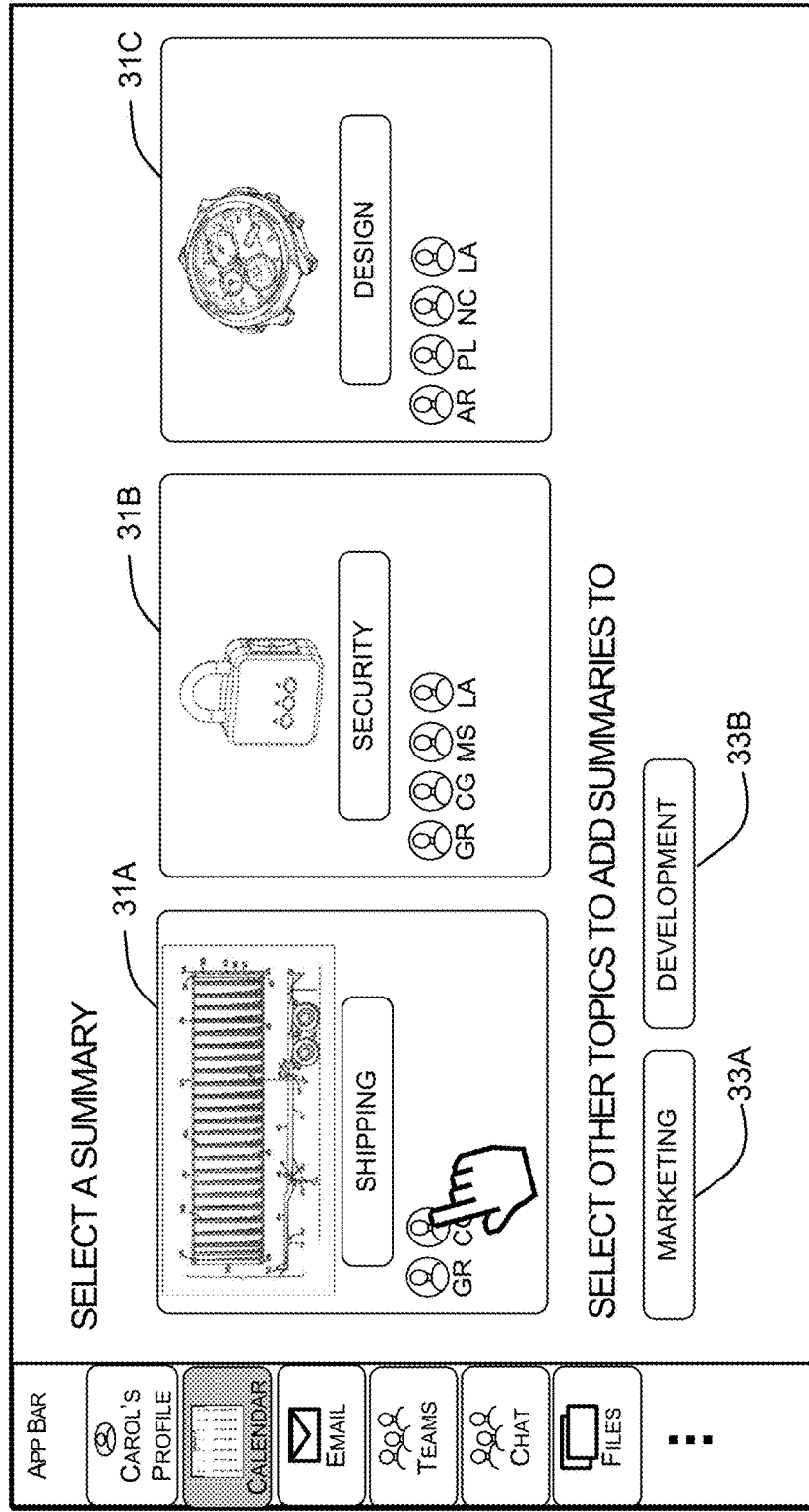
FIG. 8A illustrates a user interface displaying a number of summaries generated from the selected segments of a document.

In some configurations, a system may generate a number of different summaries based on a set of selected segments. For instance, as shown in FIG. 8A, if the system identifies a number of topics such as "shipping," "security," and "design," the system may generate summaries around each topic. The user can then select one of the summaries for review. A selection of a particular summary can be used as an input to indicate that a particular summary has a higher priority than the other summaries. Such data can be communicated back to the system 100 for the purposes of updating machine learning data. This way, the system can generate summaries in the future with a heightened level of priority for topics that were selected by a user. If the user selects a number of different summaries, the order in which the summaries are selected can dictate a priority. For instance, a first selected summary can be prioritized higher than a second selected summary.

FIG. 8A illustrates an example of a user interface 30 displaying a number of summaries 31 based on different topics. In this example, a first summary 31A is about "shipping," a second summary 31B is about "security," and a third summary 31C is about "design." Each of the summaries can be selected by a user in response to a selection, and a summary, such as the summaries described above, can be displayed to the user. In addition, in response to a selection of a summary, the topic of the summary and other supporting keywords can be sent back to a machine learning service to update machine learning data. The machine learning service can then increase a priority or relevancy level with respect to the selected topic and the supporting keywords for the purposes of improving the generation of future summaries.

The machine learning data that is collected from the techniques disclosed herein can be used for a number of different purposes. For instance, when a person interacts with a summary, such interactions can be interpreted by machine learning service to sort, order or arrange sentences of a summary. The user interactions can be based on any type of detectable activity. For instance, a system can determine if a user reads a summary. In another example, a system can determine if a person has a particular interaction with the user interface displaying the summary, e.g., they selected a task within the summary, opened a file within the summary, etc. If a particular arrangement of sentences proves to be useful for a number of users, that arrangement of sentences may be communicated to other users to optimize the effectiveness of the committee case summaries.

Also shown in FIG. 8A, the user interface 30 displays a number of selectable interface elements 33 that display other topics. These topics may come from keywords discovered in the selected segment, but the number of occurrences of the keywords did not reach a threshold. Such keywords can be offered as a particular topic for the user to select.

In response to a user selection of a selectable interface element 33, e.g., the "Advertising" button 33A or the "development" button 33B, the system 100 can generate summaries about those topics using keywords or sentences found in proximity to the topic. For instance, if a number of entries of a channel contain the word "Advertising," keywords in the same sentence as the word "Advertising" can be used to generate a summary. In addition, full sentences may be quoted from a particular channel entry and used for at least a part of a generated summary.

In response to a selection of a topic, the system may send data defining that topic to a machine learning service to update machine learning data. The machine learning service can then increase a priority or relevancy level with respect to the selected topic and the supporting keywords for the purposes of improving the generation of future summaries.

Generally described, the techniques disclosed herein, some of which are shown in FIG. 8A, can allow a user to refine the parameters that are used to generate a summary. Some embodiments enable the system 100 to identify more than one topic to generate a summary. For instance, a summary may include two topics, both of which involve a number of usernames. If the summary appears to be too broad, a user viewing the summary can narrow the summary to a single topic or specific individuals. For instance, by the use of a voice command or any other suitable type of input 90, a user can cause the system 100 to generate an updated summary 91 by adding parameters to refine the summary to a preferred topic, a particular a person, or a specific group of people. This can allow users to have further control over the level of granularity of the summary. This may help for very large threads that may have multiple topics. In addition, this type of input can be provided to a machine learning service to improve the generation of other summaries. For instance, if a particular person or a topic is selected a threshold number of times in the input 90, a priority for that particular topic or person can be increased which can make that person or topic more prevalent in other summaries.

Figure 8B:
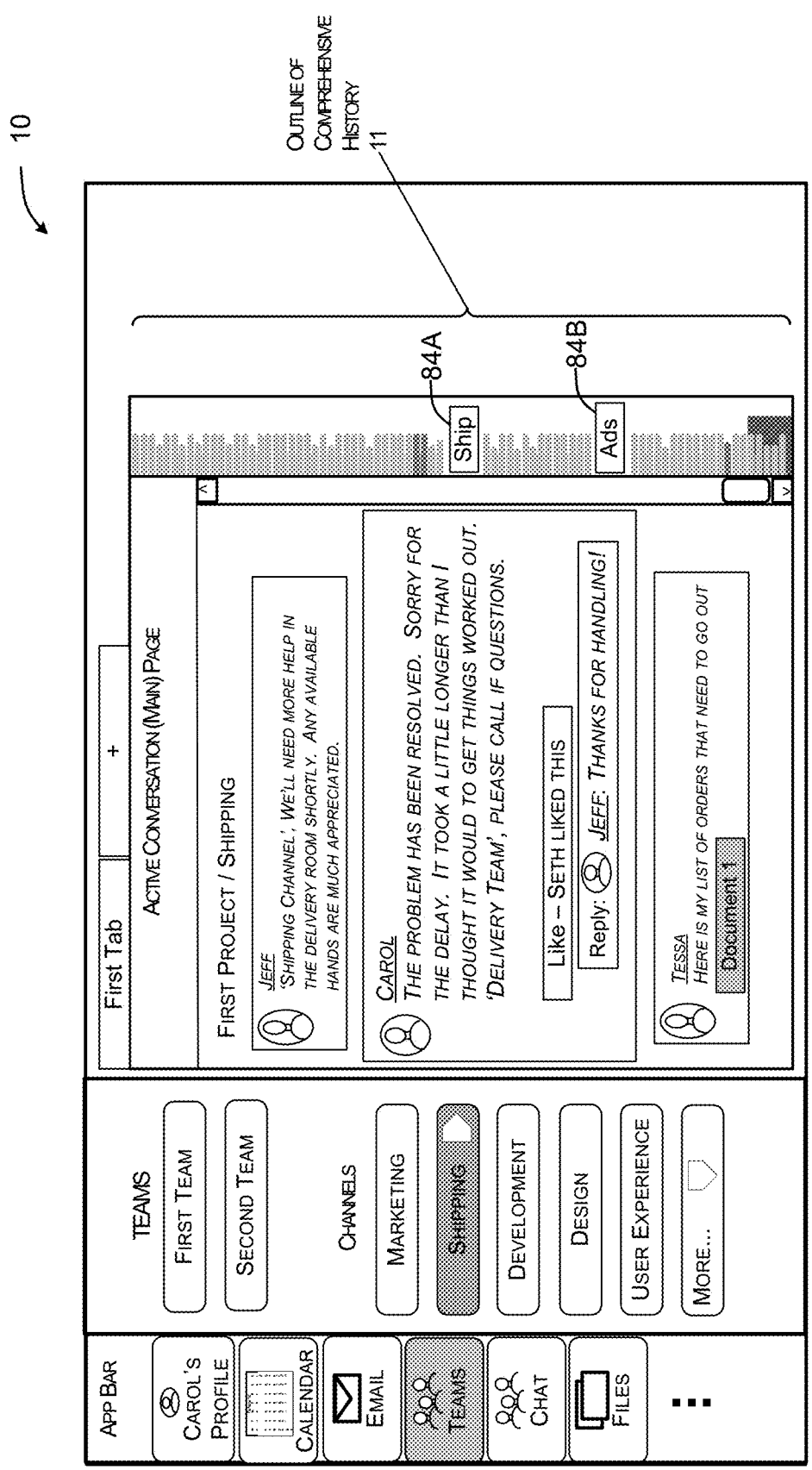
FIG. 8B illustrates a user interface displaying an example of an updated graphical element representing a history of channel items having highlighted topics.

In addition to updating a summary based on a user interaction for selecting a topic to a person, the system 100 can also update the historical graphical element (11 of FIG. 1) representing a history of a thread or document. FIG. 8B illustrates one example a user interface 10 displaying an example of an updated graphical element 11 representing a history of channel items having highlighted topics. In this example, the user interface 10 comprises a graphical element 11 that is modified based on a user interact with a summary or a list of summaries, such as the selection of a topic. For instance, if a person interacts with the user interface of FIG. 8A and selects a particular summary 31 focusing on a topic or selects a topic user interface element 33, data defining that selection can be stored and used to provide an indication of a person's priorities with respect to that topic. Thus, by an analysis of this type of activity data, a system can display highlights 84 or other graphical features that draw a user's attention to particular segments of a thread or document pertaining to a selected topic or a selected person.

Consider a scenario where a person interacts with the user interface 30 of FIG. 8A and selects the shipping and advertising interface elements to express an interest in these respective topics. In response to such an indication, the system can cause the display of the history having a first graphical element 84A that is configured to draw a user's attention to a location within a thread, e.g., one or more document segments, that relate to one of the selected topics, e.g., the "Shipping" topic. Also shown, the history 11 also comprises a second graphical element 84B that is configured to draw a user's attention to a location within a thread, e.g., one or more document segments, that relate to the other selected topic, e.g., the "Advertising" topic. By providing these updates based on a user's interaction with a summary or a user interface displaying a summary, a user can readily view a portion of a document, e.g., a segment, that might pertain to a topic of interest. This helps users navigate through large threads and in some cases helps guide users directly to an area of interest. By providing the graphical elements 84 directing users to salient information, the system can save a considerable amount of computing resources by avoiding the need for manual user inputs that may ordinarily be used to find an area of interest.

Figure 9:
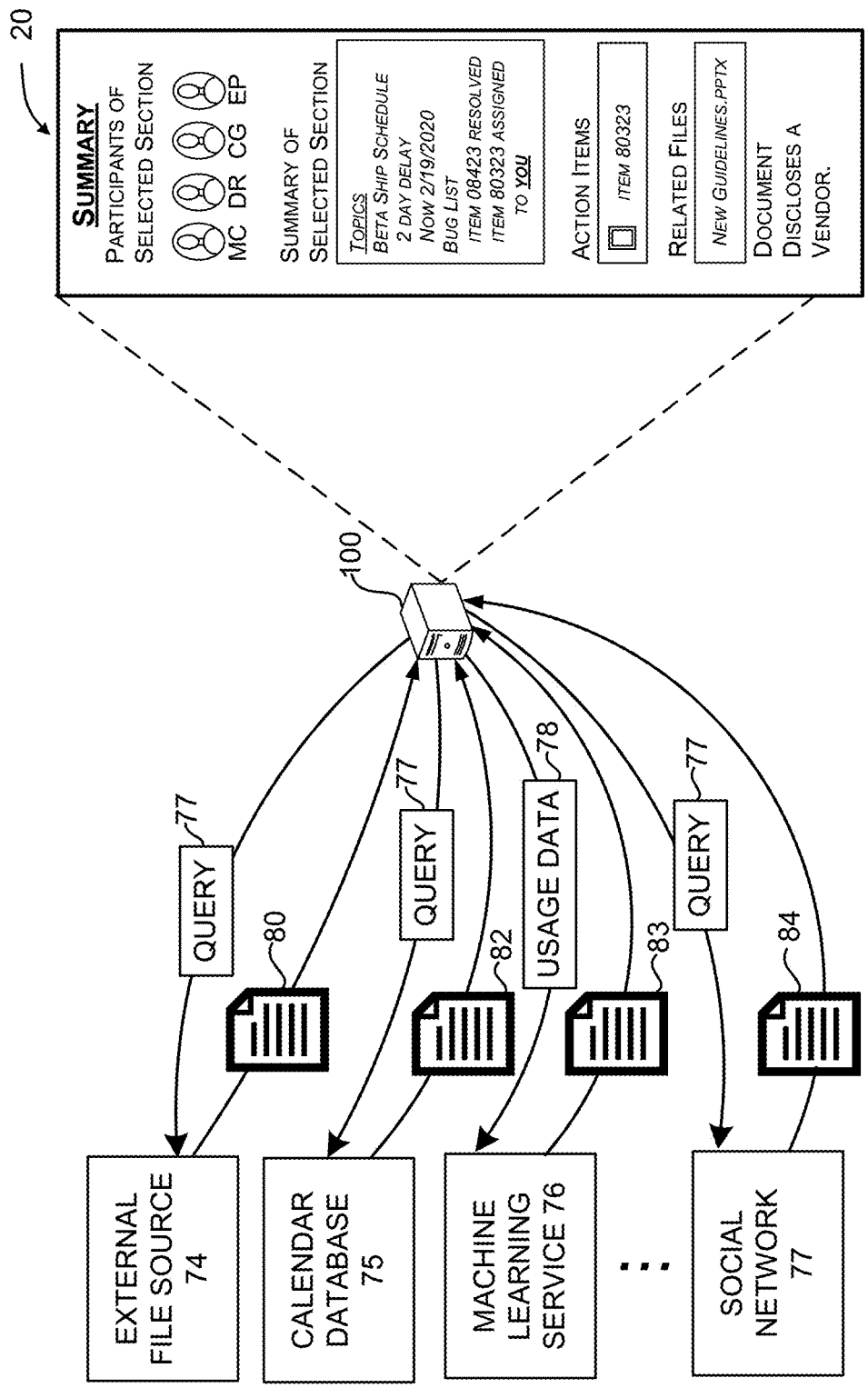
FIG. 9 illustrates an example dataflow diagram showing how a system for generating one or more summaries can collect information from various resources.

FIG. 9 illustrates how a system can interact with a number of different resources to generate a summary. In some embodiments, a system 100 can send a query 77 to an external file source 74 to obtain a document 80 that is referenced in a selected segment. The query can be based on information received from the originating document, e.g., a channel. In addition, the system 100 can send another query 77 to a calendar database 75 to receive calendar data 82. Such information can be utilized to identify dates and other scheduling information that may be utilized to generate a summary. For instance, if a particular deadline is stored in the calendar database 75, a query can be built from the content of one or more selected segments and the calendar database 75 can send calendar data 82 to confirm one or more dates. As also described herein, the system 100 can send usage data 78 to one or more machine learning services 76. In response, the machine learning service 76 can return machine learning data 83 to assist the system 100 in generating a summary. For instance, a priority with respect to certain keywords can be communicated back to the system 100 to assist the system in generating a relevant summary with a topic that is most relevant to a conversation or a selected set of segments. The system 100 can also access other resources, such as a social network 77. For instance, if the content of a selected segment indicates a first and last name of a person, additional information 84 regarding that person, such as credentials or achievements, can be retrieved for integration and generating a relevant summary.

In some configurations, the techniques disclosed herein can access permissions with respect to various aspects of a summary and control the content of the summary based on those permissions. For instance, the system 100 can determine if permissions with respect to a file or any retrieved content of an originating document are restricted, e.g., a part of a file or an entry of a channel is encrypted. If it is determined that permissions with respect to a file or any retrieved content is restricted, a system can limit the amount of disclosure of a summary that is based on the file or the retrieved content. FIG. 9 illustrates an example of such a summary. Instead of listing a vendor name, such as the example shown in FIG. 4, the summary of the example of FIG. 9 provides a summary of the file without providing specifics with regard to any party, name, or identity.

The detected permissions can also change the content for a summary on a per-user basis. For instance, if a first user has full access permissions to a file and a second user has partial access permissions to the same file, a summary displayed to the first user may include a full set of sentences generated for that summary. On the other hand, a system may redact a summary that is displayed to the second user and only show a subset of sentences or a subset of content if the permissions to that user are limited in any way.

Figure 10:
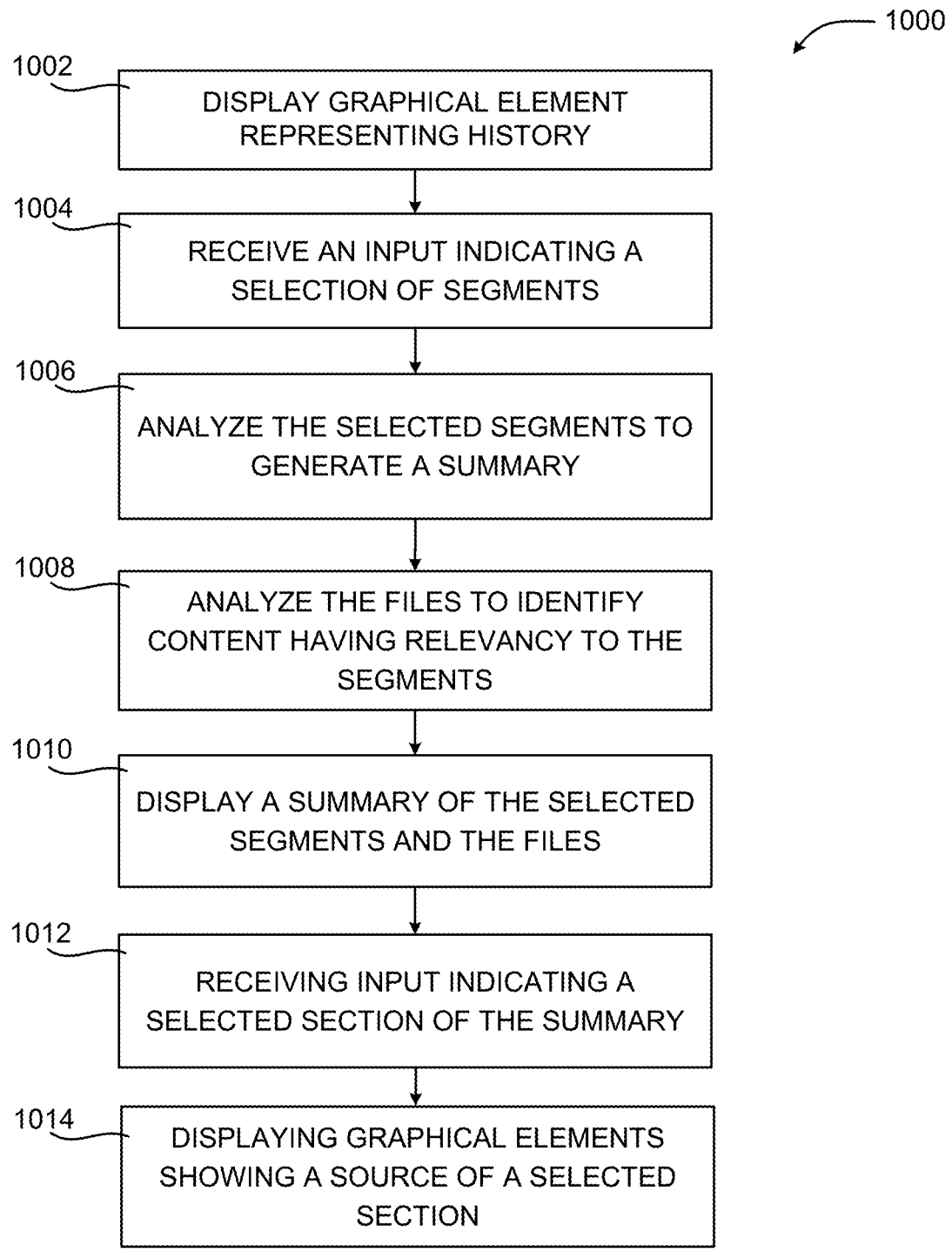
FIG. 10 is a flow diagram illustrating aspects of a routine for computationally efficient generation and management of tasks.

FIG. 10 is a diagram illustrating aspects of a routine 1000 for computationally efficient generation and management of a summary. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 10 and the other FIGURES can be implemented in association with the example presentation UIs described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, chat sessions, video streams, images, virtual objects, and/or applications associated with a communication session.

The routine 1000 begins at operation 1002, where a system 100 can display a graphical element representing a history of a thread, e.g., segments of a document. The graphical elements may include a number of different parts that each represent a segment of the document. The examples provided herein are for illustrative purposes and are not to be construed as limiting. It can be appreciated that any type of graphical element for enabling the selection of specific segments of a document can be utilized. It can also be appreciated that this operation can involve the communication of a computer-generated sound or voice that summarizes a history of a thread or a number of segments of a document.

Next, at operation 1004, the system 100 can receive an input indicating a selection of segments. The input can be based on a user input using a pointing device or a touch-screen. In addition, the input can involve a voice command indicating a start time and an end time.

Next, at operation 1006, the system 100 can analyze the selected segments. As described herein, one or more techniques can be utilized to interpret the content of the selected segments for the purpose of generating a summary. A priority can be based on the word count of certain keywords and, based on a priority, a keyword can be deemed as a topic.

Once a keyword is deemed as a topic, other keywords in the same sentence can be selected to generate a sentence describing the topic.

Next, at operation 1008, the system 100 may access the files associated with the selected segments. For instance, if a selected segment includes a link to a file, the system 100 may analyze the file for the purposes of generating summary content. If the contents have a threshold level of relevancy to the selected segments or a selected topic, the system 100 may summarize the contents of the file by the use of computer-generated sentences or by extracting sentences from the file itself. If the file is a video file, images can be rendered to enable the system 100 to interpret text that may be displayed within the file. If the file includes an audio component, one or more techniques for transcribing any speech within the audio component can be utilized.

Next, at operation 1010, the system can display a summary of the selected segments and/or the contents of the file. In some configurations, the system may utilize direct quotes from the selected segments and the file. Alternatively, a combination of computer-generated sentences and direct quotes from the selected segments and the file may be utilized.

Next, at operation 1012, the system receives input indicating a selection section of the summary. In operation 1012, in some embodiments, the selection can involve a first level of interaction, such as a hover or a single tap on a touch device. The first level of interaction can be used to display graphical elements such as user identities or a display of a source for selected content of a summary. A second level of interaction, such as a double tap on a touch device or an actual input from a pointing device, such as a mouse, can be used for other type of actions, e.g., causing a user interface of a document to scroll to a related section, etc. these examples are provided for illustrative purposes and are not to be construed as limiting. It can be appreciated any level of interaction can be used to invoke different operations disclosed herein.

Next, at operation 1014, the system 100 can display graphic elements showing a source of a selected section of a summary. As described herein, a user input can select a section of a summary and in response to that input, the system can display the names of individuals that contributed to that section of the summary. Operation 1014 can also involve different types of actions such as, but not limited to, causing a user interface displaying a document to scroll to a particular location of a document.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 11:
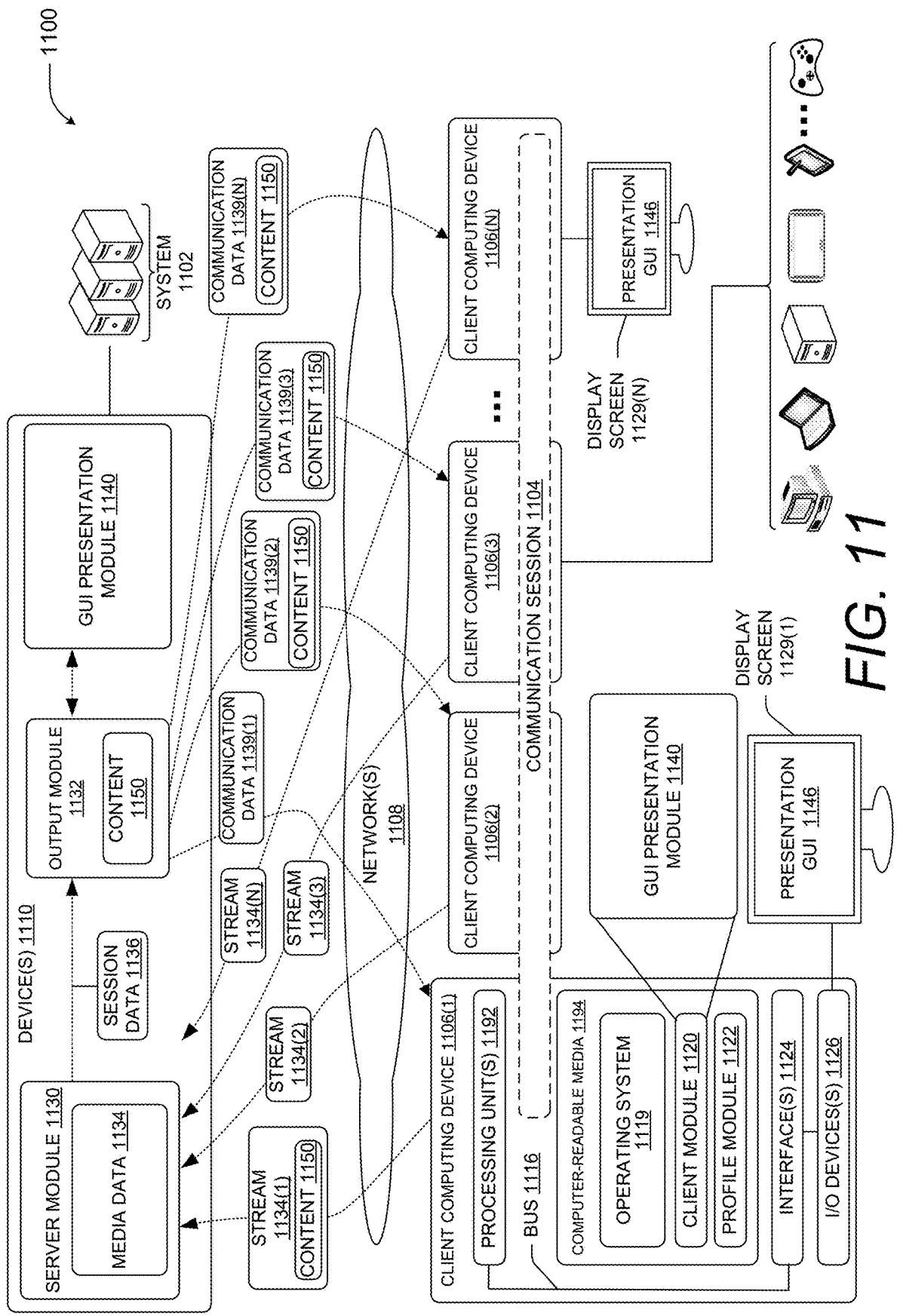
FIG. 11 is a computing system diagram showing aspects of an illustrative operating environment for the technologies disclosed herein.

FIG. 11 is a diagram illustrating an example environment 1100 in which a system 1102 can implement the techniques disclosed herein. In some implementations, a system 1102 may function to collect, analyze, and share data defining one or more objects that are displayed to users of a communication session 1004.

As illustrated, the communication session 1104 may be implemented between a number of client computing devices 1106(1) through 1106(N) (where N is a number having a value of two or greater) that are associated with the system 1102 or are part of the system 1102. The client computing devices 1106(1) through 1106(N) enable users, also referred to as individuals, to participate in the communication session 1104.

In this example, the communication session 1104 is hosted, over one or more network(s) 1108, by the system 1102. That is, the system 1102 can provide a service that enables users of the client computing devices 1106(1) through 1106(N) to participate in the communication session 1104 (e.g., via a live viewing and/or a recorded viewing). Consequently, a "participant" to the communication session 1104 can comprise a user and/or a client computing device (e.g., multiple users may be in a room participating in a communication session via the use of a single client computing device), each of which can communicate with other participants. As an alternative, the communication session 1104 can be hosted by one of the client computing devices 1106(1) through 1106(N) utilizing peer-to-peer technologies. The system 1102 can also host chat conversations and other team collaboration functionality (e.g., as part of an application suite).

In some implementations, such chat conversations and other team collaboration functionality are considered external communication sessions distinct from the communication session 1104. A computerized agent to collect participant data in the communication session 1104 may be able to link to such external communication sessions. Therefore, the computerized agent may receive information, such as date, time, session particulars, and the like, that enables connectivity to such external communication sessions. In one example, a chat conversation can be conducted in accordance with the communication session 1104. Additionally, the system 1102 may host the communication session 1104, which includes at least a plurality of participants co-located at a meeting location, such as a meeting room or auditorium, or located in disparate locations.

In the examples described herein, client computing devices 1106(1) through 1106(N) participating in the communication session 1104 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 1104 live as activity occurs, or alternatively, via a recording at a later time after the activity occurs. In examples described herein, client computing devices 1106(1) through 1106(N) participating in the communication session 1104 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations. Each stream can also include text, audio and video data, such as the data communicated within a Channel, chat board, or a private messaging service.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 1102 includes device(s) 1110. The device(s) 1110 and/or other components of the system 1102 can include distributed computing resources that communicate with one another and/or with the client computing devices 1106(1) through 1106(N) via the one or more network(s) 1108. In some examples, the system 1102 may be an independent system that is tasked with managing aspects of one or more communication sessions such as communication session 1104. As an example, the system 1102 may be managed by entities such as SLACK, WEBEX, GOTOMEETING, GOOGLE HANGOUTS, etc.

Network(s) 1108 may include, for example, public networks such as the Internet, private networks such as an institutional and/or personal intranet, or some combination of private and public networks. Network(s) 1108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 1108 may utilize communications protocols, including packet-based and/or datagram-based protocols such as Internet protocol ("IP"), transmission control protocol ("TCP"), user datagram protocol ("UDP"), or other types of protocols. Moreover, network(s) 1108 may also include a number of devices that facilitate network communications and/or form a hardware basis for the networks, such as switches, routers, gateways, access points, firewalls, base stations, repeaters, backbone devices, and the like.

In some examples, network(s) 1108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 1110 may include one or more computing devices that operate in a cluster or other grouped configuration to share resources, balance load, increase performance, provide fail-over support or redundancy, or for other purposes. For instance, device(s) 1110 may belong to a variety of classes of devices such as traditional server-type devices, desktop computer-type devices, and/or mobile-type devices. Thus, although illustrated as a single type of device or a server-type device, device(s) 1110 may include a diverse variety of device types and are not limited to a particular type of device. Device(s) 1110 may represent, but are not limited to, server computers, desktop computers, web-server computers, personal computers, mobile computers, laptop computers, tablet computers, or any other sort of computing device.

A client computing device (e.g., one of client computing device(s) 1106(1) through 1106(N)) may belong to a variety of classes of devices, which may be the same as, or different from, device(s) 1110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 1106(1) through 1106(N) of the various classes and device types can represent any type of computing device having one or more data processing unit(s) 1192 operably connected to computer-readable media 1194 such as via a bus 1116, which in some instances can include one or more of a system bus, a data bus, an address bus, a PCI bus, a Mini-PCI bus, and any variety of local, peripheral, and/or independent buses.

Executable instructions stored on computer-readable media 1194 may include, for example, an operating system 1119, a client module 1120, a profile module 1122, and other modules, programs, or applications that are loadable and executable by data processing units(s) 1192.

Client computing device(s) 1106(1) through 1106(N) may also include one or more interface(s) 1124 to enable communications between client computing device(s) 1106(1) through 1106(N) and other networked devices, such as device(s) 1110, over network(s) 1108. Such network interface(s) 1124 may include one or more network interface controllers (NICs) or other types of transceiver devices to send and receive communications and/or data over a network. Moreover, client computing device(s) 1106(1) through 1106(N) can include input/output ("I/O") interfaces (devices) 1126 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 11 illustrates that client computing device 1106(1) is in some way connected to a display device (e.g., a display screen 1129(1)), which can display a UI according to the techniques described herein.

In the example environment 1100 of FIG. 11, client computing devices 1106(1) through 1106(N) may use their respective client modules 1120 to connect with one another and/or other external device(s) in order to participate in the communication session 1104, or in order to contribute activity to a collaboration environment. For instance, a first user may utilize a client computing device 1106(1) to communicate with a second user of another client computing device 1106(2). When executing client modules 1120, the users may share data, which may cause the client computing device 1106(1) to connect to the system 1102 and/or the other client computing devices 1106(2) through 1106(N) over the network(s) 1108.

The client computing device(s) 1106(1) through 1106(N) (each of which are also referred to herein as a "data processing system") may use their respective profile modules 1122 to generate participant profiles (not shown in FIG. 11) and provide the participant profiles to other client computing devices and/or to the device(s) 1110 of the system 1102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 11, the device(s) 1110 of the system 1102 include a server module 1130 and an output module 1132. In this example, the server module 1130 is configured to receive, from individual client computing devices such as client computing devices 1106(1) through 1106(N), media streams 1134(1) through 1134(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 1130 is configured to receive a collection of various media streams 1134(1) through 1134 (N) during a live viewing of the communication session 1104 (the collection being referred to herein as "media data 1134"). In some scenarios, not all of the client computing devices that participate in the communication session 1104 provide a media stream. For example, a client computing device may only be a consuming, or a "listening", device such that it only receives content associated with the communication session 1104 but does not provide any content to the communication session 1104.

In various examples, the server module 1130 can select aspects of the media streams 1134 that are to be shared with individual ones of the participating client computing devices 1106(1) through 1106(N). Consequently, the server module 1130 may be configured to generate session data 1136 based on the streams 1134 and/or pass the session data 1136 to the output module 1132. Then, the output module 1132 may communicate communication data 1139 to the client computing devices (e.g., client computing devices 1106(1) through 1106(3) participating in a live viewing of the communication session). The communication data 1139 may include video, audio, and/or other content data, provided by the output module 1132 based on content 1150 associated with the output module 1132 and based on received session data 1136.

As shown, the output module 1132 transmits communication data 1139(1) to client computing device 1106(1), and transmits communication data 1139(2) to client computing device 1106(2), and transmits communication data 1139(3) to client computing device 1106(3), etc. The communication data 1139 transmitted to the client computing devices can be the same or can be different (e.g., positioning of streams of content within a user interface may vary from one device to the next).

In various implementations, the device(s) 1110 and/or the client module 1120 can include GUI presentation module 1140. The GUI presentation module 1140 may be configured to analyze communication data 1139 that is for delivery to one or more of the client computing devices 1106. Specifically, the GUI presentation module 1140, at the device(s) 1110 and/or the client computing device 1106, may analyze communication data 1139 to determine an appropriate manner for displaying video, image, and/or content on the display screen 1129 of an associated client computing device 1106. In some implementations, the GUI presentation module 1140 may provide video, image, and/or content to a presentation GUI 1146 rendered on the display screen 1129 of the associated client computing device 1106. The presentation GUI 1146 may be caused to be rendered on the display screen 1129 by the GUI presentation module 1140. The presentation GUI 1146 may include the video, image, and/or content analyzed by the GUI presentation module 1140.

In some implementations, the presentation GUI 1146 may include a plurality of sections or grids that may render or comprise video, image, and/or content for display on the display screen 1129. For example, a first section of the presentation GUI 1146 may include a video feed of a presenter or individual, a second section of the presentation GUI 1146 may include a video feed of an individual consuming meeting information provided by the presenter or individual. The GUI presentation module 1140 may populate the first and second sections of the presentation GUI 1146 in a manner that properly imitates an environment experience that the presenter and the individual may be sharing.

In some implementations, the GUI presentation module 1140 may enlarge or provide a zoomed view of the individual represented by the video feed in order to highlight a reaction, such as a facial feature, the individual had to the presenter. In some implementations, the presentation GUI 1146 may include a video feed of a plurality of participants associated with a meeting, such as a general communication session. In other implementations, the presentation GUI 1146 may be associated with a channel, such as a chat channel, enterprise teams channel, or the like. Therefore, the presentation GUI 1146 may be associated with an external communication session that is different than the general communication session.

Figure 12:
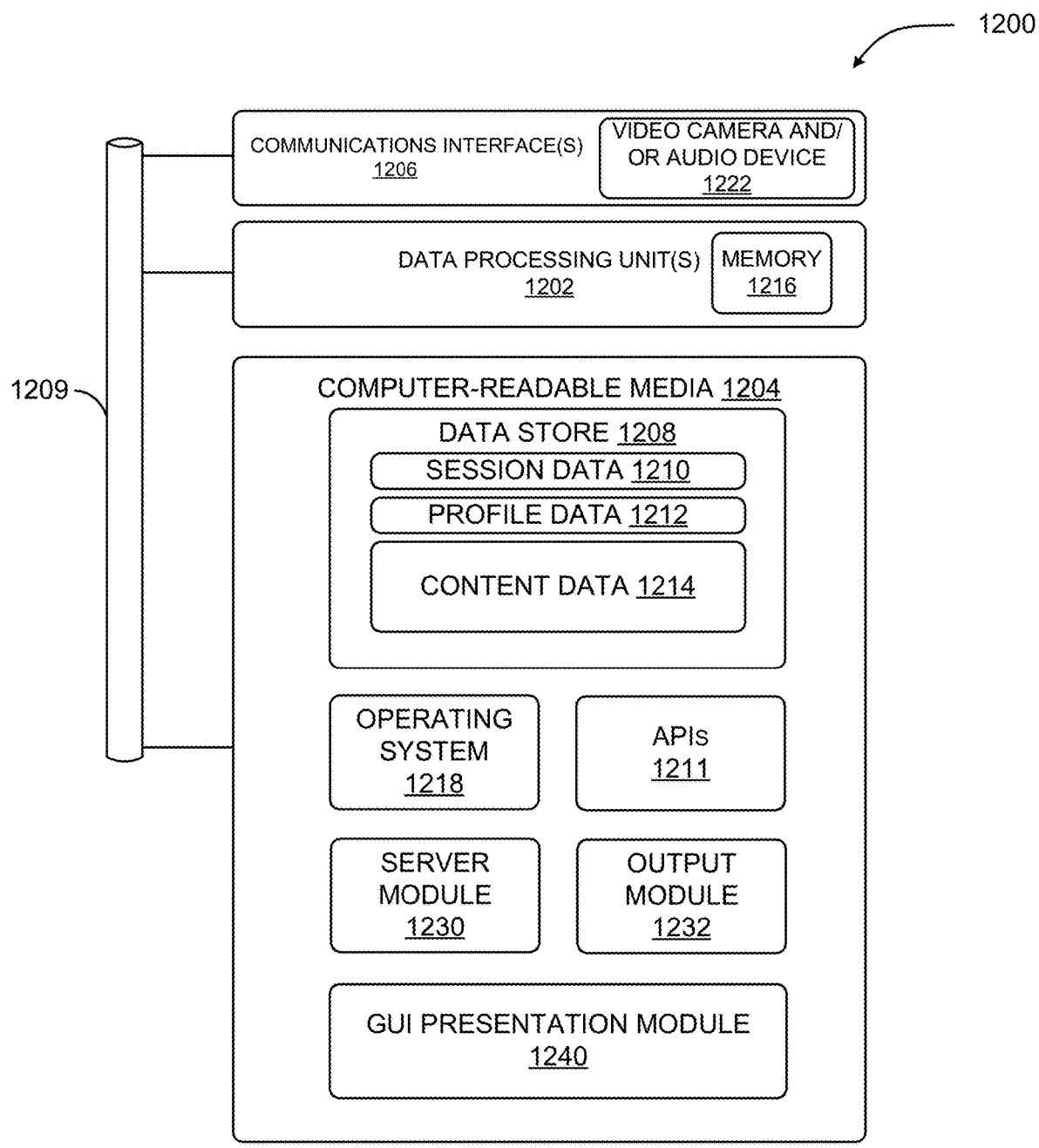
FIG. 12 is a computing architecture diagram showing aspects of the configuration and operation of a computing device that can implement aspects of the technologies disclosed herein.

FIG. 12 illustrates a diagram that shows example components of an example device 1200 (also referred to herein as a "computing device") configured to generate data for some of the user interfaces disclosed herein. The device 1200 may generate data that may include one or more sections that may render or comprise video, images, virtual objects, and/or content for display on the display screen 1129. The device 1200 may represent one of the device(s) described herein. Additionally, or alternatively, the device 1200 may represent one of the client computing devices 1106.

As illustrated, the device 1200 includes one or more data processing unit(s) 1202, computer-readable media 1204, and communication interface(s) 1206. The components of the device 1200 are operatively connected, for example, via a bus 1209, which may include one or more of a system bus, a data bus, an address bus, a PCI bus, a Mini-PCI bus, and any variety of local, peripheral, and/or independent buses.

As utilized herein, data processing unit(s), such as the data processing unit(s) 1202 and/or data processing unit(s) 1192, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 1204 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 1206 may represent, for example, network interface controllers ("NICs") or other types of transceiver devices to send and receive communications over a network. Furthermore, the communication interface(s) 1206 may include one or more video cameras and/or audio devices 1222 to enable generation of video feeds and/or still images, and so forth.

In the illustrated example, computer-readable media 1204 includes a data store 1208. In some examples, the data store 1208 includes data storage such as a database, data warehouse, or other type of structured or unstructured data storage. In some examples, the data store 1208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 1208 may store data for the operations of processes, applications, components, and/or modules stored in computer-readable media 1204 and/or executed by data processing unit(s) 1202 and/or accelerator(s). For instance, in some examples, the data store 1208 may store session data 1210 (e.g., session data 1136), profile data 1212 (e.g., associated with a participant profile), and/or other data. The session data 1210 can include a total number of participants (e.g., users and/or client computing devices) in a communication session, activity that occurs in the communication session, a list of invitees to the communication session, and/or other data related to when and how the communication session is conducted or hosted. The data store 1208 may also include content data 1214, such as the content that includes video, audio, or other content for rendering and display on one or more of the display screens 1129.

Alternately, some or all of the above-referenced data can be stored on separate memories 1216 on board one or more data processing unit(s) 1202 such as a memory on board a CPU-type processor, a GPU-type processor, an FPGA-type accelerator, a DSP-type accelerator, and/or another accelerator. In this example, the computer-readable media 1204 also includes an operating system 1218 and application programming interface(s) 1211 (APIs) configured to expose the functionality and the data of the device 1200 to other devices. Additionally, the computer-readable media 1204 includes one or more modules such as the server module 1230, the output module 1232, and the GUI presentation module 1240, although the number of illustrated modules is just an example, and the number may vary higher or lower. That is, functionality described herein in association with the illustrated modules may be performed by a fewer number of modules or a larger number of modules on one device or spread across multiple devices.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method to be performed by a data processing system, the method comprising:
displaying, at the data processing system, a user interface comprising a main display area for displaying a thread of messages and a graphical element having a number of segments representing the thread of messages, wherein the user interface is configured to receive an input defining a range of messages of the thread based on a number of selected segments representing individual messages in the thread;
receiving the input from the graphic element indicating a selection of a subset of the segments, the input defining the range for generating a summary from messages that are within the range that is based on the number of selected segments representing individual messages in the thread;
analyzing messages associated with the subset of the segments to generate a number of sentences describing content of at least a portion of the messages associated with the subset of the segments selected from the input defining the range based on the number of selected segments representing individual messages; and
causing a display of the summary comprising the number of sentences describing content of the at least a portion of the messages associated with the subset of the segments selected from the input defining the range based on the number of selected segments representing individual messages.

2. The method of claim 1, further comprising:
receiving an adjustment to the input, the adjustment increasing or decreasing the number of segments of the subset of the segments;
adding content to the summary in response to an adjustment to the input that increases the number of segments of the subset of the segments; and
removing content from the summary in response to an adjustment to the input that decreases the number of segments of the subset of the segments.

3. The method of claim 1, further comprising:
analyzing content of the subset of the segments to identify a task and an associated user; and
displaying the identified task concurrently with the number of sentences and the content of at least one file having a threshold of relevancy to the subset of the segments.

4. The method of claim 1, further comprising generating a graphical element in association with a first section of the summary, the graphical element indicating a source of the content of the first section.

5. The method of claim 1, further comprising generating a graphical element distinguishing computer-generated sentences from sentences that are extracted from the subset of the segments.

6. The method of claim 1, further comprising:
determining one or more permissions for at least one file having a threshold of relevancy to the subset of the segments, the permissions associated with at least one user identity;
redacting at least a portion of the number of sentences based on the one or more permissions for a summary to be displayed to user identities other than the at least one user identity.

7. The method of claim 1, further comprising:
determining one or more permissions for at least one file having a threshold of relevancy to the subset of the segments; and
redacting at least a portion of the number of sentences based on the one or more permissions.

8. The method of claim 1, further comprising: generating a graphical element in association with a section of the summary, the graphical element indicating that the content of the section of the summary is a direct quote from at least one entry of the subset of the segments.

9. The method of claim 1, further comprising:
receiving an input identifying a section of the summary; and
in response to the input identifying a section of the summary, navigating a user interface display of the subset of the segments to a segment having content that was used as a source to generate the section of the summary.

10. The method of claim 1, further comprising:
causing the display of the summary concurrently with additional summaries generated from the number of segments, wherein the summary and the additional summaries are each associated with an individual topic;
receiving a selection of the summary or the additional summaries and selecting a corresponding topic based on the selection; and
communicating the topic to at least one machine learning resource for updating machine learning data to increase the priority of the topic for the generation of other summaries that are based on the number of segments.

11. The method of claim 1, further comprising:
causing the display of the summary concurrently with additional summaries generated from the number of segments, wherein the summary and the additional summaries are each associated with an individual topic;
receiving a selection of the summary or the additional summaries and selecting a corresponding topic based on the selection; and
communicating the topic to at least one machine learning resource for updating machine learning data to increase a relevancy level of the topic for the generation of other summaries that are based on the number of segments.

12. The method of claim 1, further comprising:
receiving an input indicating a selected topic;
generating a set of new sentences using the number of sentences describing the content of the subset of the segments, wherein the new sentences are generated by filtering content that is not related to the selected topic; and
generating a display of an updated summary using the new sentences.

13. The method of claim 1, wherein the portion of the messages associated with the subset of the segments are included in the summary if the portion of the messages associated with the subset of the segments meets a threshold requirement or a priority threshold for inclusion of content from the portion of the messages in the summary.

14. A system comprising:
one or more data processing units; and
a computer-readable medium having encoded thereon computer-executable instructions to cause the one or more data processing units to:
display a user interface comprising a main display area for displaying a thread of messages and a graphical element having a number of segments representing the thread of messages, wherein the user interface is configured to receive an input defining a range of messages of the thread based on a number of selected segments representing individual messages in the thread;
receive the input from the graphic element indicating a selection of a subset of the segments, the input defining the range for generating a summary from messages that are within the range that is based on the number of selected segments representing individual messages in the thread;
analyze messages associated with the subset of the segments to generate a number of sentences describing content of at least a portion of the messages associated with the subset of the segments selected from the input defining the range based on the number of selected segments representing individual messages; and
cause a display of the summary comprising the number of sentences describing content of the at least a portion of the messages associated with the subset of the segments selected from the input defining the range based on the number of selected segments representing individual messages.

15. The system of claim 14, wherein the content exceeds a priority threshold in response to determining that a number of occurrences of a keyword within the subset of the segments exceeds a threshold, wherein the keyword is selected as a topic for at least one sentence of the number of sentences.

16. The system of claim 14, wherein the instructions further cause the one or more data processing units to:
receive an adjustment to the input, the adjustment increasing or decreasing the number segments of the subset of the segments;
add content to the summary in response to an adjustment to the input that increases the number of segments of the subset of the segments; and
remove content from the summary in response to an adjustment to the input that decreases the number of segments of the subset of the segments.

17. A system, comprising:
means for displaying a user interface comprising a main display area for displaying a thread of messages and a graphical element having a number of segments representing the thread of messages, wherein the user interface is configured to receive an input defining a range of messages of the thread based on a number of selected segments representing individual messages in the thread;
means for receiving the input from the graphic element indicating a selection of a subset of the segments, the input defining the range for generating a summary from messages that are within the range that is based on the number of selected segments representing individual messages in the thread;
means for analyzing messages associated with the subset of the segments to generate a number of sentences describing content of at least a portion of the messages associated with the subset of the segments selected from the input defining the range based on the number of selected segments representing individual messages; and
means for causing a display of the summary comprising the number of sentences describing content of the at least a portion of the messages associated with the subset of the segments selected from the input defining the range based on the number of selected segments representing individual messages.

18. The system of claim 17, wherein the system further comprises a means for generating a graphical element in association with a first section of the summary, the graphical element indicating a source of the content of the first section.

19. The system of claim 17, wherein the system further comprises a means for generating a graphical element distinguishing computer-generated sentences from sentences that are extracted from the subset of the segments.

20. The system of claim 17, wherein the system further comprises:
means for determining one or more permissions for at least one file having a threshold of relevancy to the subset of the segments, the permissions associated with at least one user identity; and
means for redacting at least a portion of the number of sentences based on the one or more permissions for a summary to be displayed to user identities other than the at least one user identity.

21. The system of claim 17, wherein the system further comprises:
means for determining one or more permissions for at least one file having a threshold of relevancy to the subset of the segments; and
means for redacting at least a portion of the number of sentences based on the one or more permissions.

* * * * *